(12) United States Patent
Shimono et al.

(10) Patent No.: US 11,279,316 B2
(45) Date of Patent: Mar. 22, 2022

(54) AIRBAG DEVICE AND MANUFACTURING METHOD THEREOF

(71) Applicant: Autoliv Development AB, Vargarda (SE)

(72) Inventors: Hiroyoshi Shimono, Kanagawa (JP); Yuto Kobayashi, Kanagawa (JP); Tsutomu Sakurai, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/193,150

(22) Filed: Mar. 5, 2021

(65) Prior Publication Data

US 2021/0291777 A1 Sep. 23, 2021

(30) Foreign Application Priority Data

Mar. 13, 2020 (JP) .............................. JP2020-044356
Jan. 6, 2021 (JP) .............................. JP2021-001080

(51) Int. Cl.
*B60R 21/237* (2006.01)
*B60R 21/207* (2006.01)
*B60R 21/217* (2011.01)
*B60R 21/231* (2011.01)

(52) U.S. Cl.
CPC .......... *B60R 21/237* (2013.01); *B60R 21/207* (2013.01); *B60R 21/2171* (2013.01); *B60R 21/23138* (2013.01); *B60R 2021/23146* (2013.01); *B60R 2021/23161* (2013.01)

(58) Field of Classification Search
None
See application file for complete search history.

(56) References Cited

U.S. PATENT DOCUMENTS

| 7,178,826 B2 * | 2/2007 | Acker | B60R 21/207 |
| | | | 280/728.2 |
| 8,047,564 B2 * | 11/2011 | Kibat | B60R 21/2338 |
| | | | 280/730.2 |
| 8,075,018 B2 * | 12/2011 | Sugimoto | B60R 21/237 |
| | | | 280/743.1 |

(Continued)

FOREIGN PATENT DOCUMENTS

| JP | 2010-115947 A | | 5/2010 | | |
| KR | 20210046569 A | * | 4/2021 | ........... | B60R 21/207 |
| WO | WO-2021023542 A1 | * | 2/2021 | ........... | B60R 21/207 |

*Primary Examiner* — Faye M Fleming
(74) *Attorney, Agent, or Firm* — Harness, Dickey & Pierce, P.L.C.; Stephen T. Olson (57) ABSTRACT

An airbag cushion, which expands and deploys between adjacent seats in a passenger compartment, comprising a top panel and bottom panel that are separated and face each other vertically when deployed, side panels connecting the edges of the top panel and the bottom panel, a protruding part that protrudes upward from the top panel, a cylindrical inflator attached along the inner surface of the side panel on the side of the protruding part is stowed in a folded state by overlaying the top panel and the side panel provided with the attachment part of the inflator, and lining up a first roll part which is the protruding part rolled up, a fold-back part which is the first side part folded back to cover the attachment part of the inflator, and a second roll part on top of the top panel with the second roll part in the center.

4 Claims, 6 Drawing Sheets

(56) References Cited

U.S. PATENT DOCUMENTS

| | | | |
|---|---|---|---|
| 10,351,092 B2* | 7/2019 | Taguchi | B60R 21/23138 |
| 10,875,487 B2* | 12/2020 | Kobayashi | B60R 21/233 |
| 11,104,289 B2* | 8/2021 | Kobayashi | B60R 21/231 |
| 2017/0158160 A1* | 6/2017 | Sugimori | B60R 21/264 |
| 2020/0254960 A1* | 8/2020 | Kobayashi | B60R 21/23138 |
| 2021/0046895 A1* | 2/2021 | Kobayashi | B60N 2/986 |

* cited by examiner

AIRBAG DEVICE AND MANUFACTURING METHOD THEREOF

TECHNICAL FIELD

The present invention relates to an airbag device and to a manufacturing method of an airbag device.

BACKGROUND

In recent years, many vehicles have been equipped with airbag devices. Airbag devices are activated in the event of an emergency such as a vehicle collision or the like, and the occupants are protected by an airbag cushion that expands and deploys under gas pressure. There are various types of airbag devices depending on the installation location and application, one of which is an airbag device, or a so-called side airbag device, which includes an airbag cushion that expands and deploys in between seats adjacent to each other in a passenger compartment (for example, between a driver seat and a passenger seat), laterally restrains the occupants seated in the respective seats, inhibiting horizontal movement of the occupants in the event of a side collision (see Patent Document 1).

RELATED ART DOCUMENTS

Patent Documents

Patent Document 1: JP 2010-115947 A

SUMMARY OF THE INVENTION

Problem to be Solved by the Invention

However, the airbag device described in Patent Document 1 includes an airbag cushion having a large size that occupies a space between the adjacent seats when expanded and deployed, and it is necessary to increase the amount of gas generated in the inflator that supplies the gas for inflation to the airbag cushion.

To solve this problem, an airbag cushion having a plurality of parts that expand and deploy in different directions has been proposed. This airbag cushion has, for example, a main deployment part that expands and deploys so as to expand laterally at a height position corresponding to the torso and shoulder portions of an occupant seated in a seat, and a protruding part that expands and deploys so as to protrude upwardly at the center of the top surface of the main deployment part. According to the airbag device provided with this airbag cushion, the torso and shoulders of the occupants can be supported on both sides of the main deployment part, and the head of the moving occupant can be supported by the protruding part, such that the desired protective functions can be fulfilled with a small airbag cushion.

However, with such airbag devices, a problem may arise in which a plurality of portions are entangled when the airbag cushion expands and deploys from the stowed state, and as a result, the deployed state of the airbag cushion, which is anticipated after the completion of expansion, cannot be obtained.

An object of the present disclosure is to provide an airbag device and a manufacturing method thereof which can favorably achieve the anticipated deployed state of the airbag cushion after completion of expansion.

Means for Solving the Problem

The manufacturing method of the airbag device according to the present disclosure is a manufacturing method of an airbag device composed of an airbag cushion that expands and deploys between adjacent seats and in a passenger compartment and restrains passengers seated at each of the seats from the side, wherein the airbag cushion is made up of a top panel and a bottom panel that face each other in the vertical direction during expansion and deployment, a side panel that connects the peripheral edges of the top panel and the bottom panel, a protruding part that protrudes upwards from the top panel, and an inflator that is cylindrical in shape attached along the inner surface of the side panel on one side of the protruding part. Steps for folding the airbag cushion into a stowed state include a first step of folding such that the attachment part of the top panel and the inflator are front-to-back with the side panel, a second step of rolling the protruding part from the edge into a roll shape and forming a first roll part that overlaps the top panel, a third step of folding back such that the first side part that includes the attachment part covers the attachment part and forms a fold-back part of which edge is placed near the edge of the first roll part, and a fourth step of rolling the second side part that does not include the attachment points into a roll shape to form the second roll part, to be placed in between the first roll part and the fold-back part.

A pull-out step is further included before the first step to pull the bottom panel out from between the side panels.

In addition, a fold-in step is further included between the first step and the second step, or between the second step and the third step, where the overhanging portion of the bottom panel and the side panels resulting from the first step are folded in between the overlapping portion of the top panel and the side panels.

Further, the airbag device according to the present disclosure is composed of an airbag cushion that expands and deploys between adjacent seats and in a passenger compartment and restrains, from the side, passengers who are seated in each of the seats. The airbag cushion is made up of a top panel and a bottom panel that face each other in the vertical direction during expansion and deployment, a side panel that connects the peripheral edges of the top panel and the bottom panel, a protruding part that protrudes upwards from the top panel, and an inflator that is cylindrical in shape attached along the inner surface of the side panel on one side of the protruding part. Herein, the airbag device is stored by overlaying such that the top panel and the side panel provided with the attachment part of the inflator are front-to-back, the first roll part which is the protruding part rolled into a roll shape, a fold-back part which is the first side part that includes the attachment part folded back in a manner covering the attachment part, and a second roll part which is the second side part rolled into a roll shape, line up above the top panel with the second roll part in the center.

Effect of the Invention

According to the present disclosure, entanglement of the various parts of the folded airbag cushion can be prevented when expanding and deploying, reliably achieving the anticipated deployed state after completion of expansion, and favorably achieving protection of the occupants in the event of a collision.

EMBODIMENT OF THE INVENTION

Embodiments of the present disclosure will be described below with reference to the drawings. In addition, the "vertical direction" of the vehicle used in the descriptions below indicates a direction on a line connecting the center of the roof of the vehicle to the center of the floor of the vehicle, where the direction toward the roof is "upper" and the direction toward the floor is "lower". Additionally, the "front-rear direction" refers to the direction in which the vehicle travels, the advancing direction is the "forward direction", and the reverse direction is the "backward direction". Furthermore, the "vehicle width direction" is the direction orthogonal to the "front-rear direction" described above, and is the direction in which the regular seats are arranged in a line in the passenger compartment.

Figure 1:
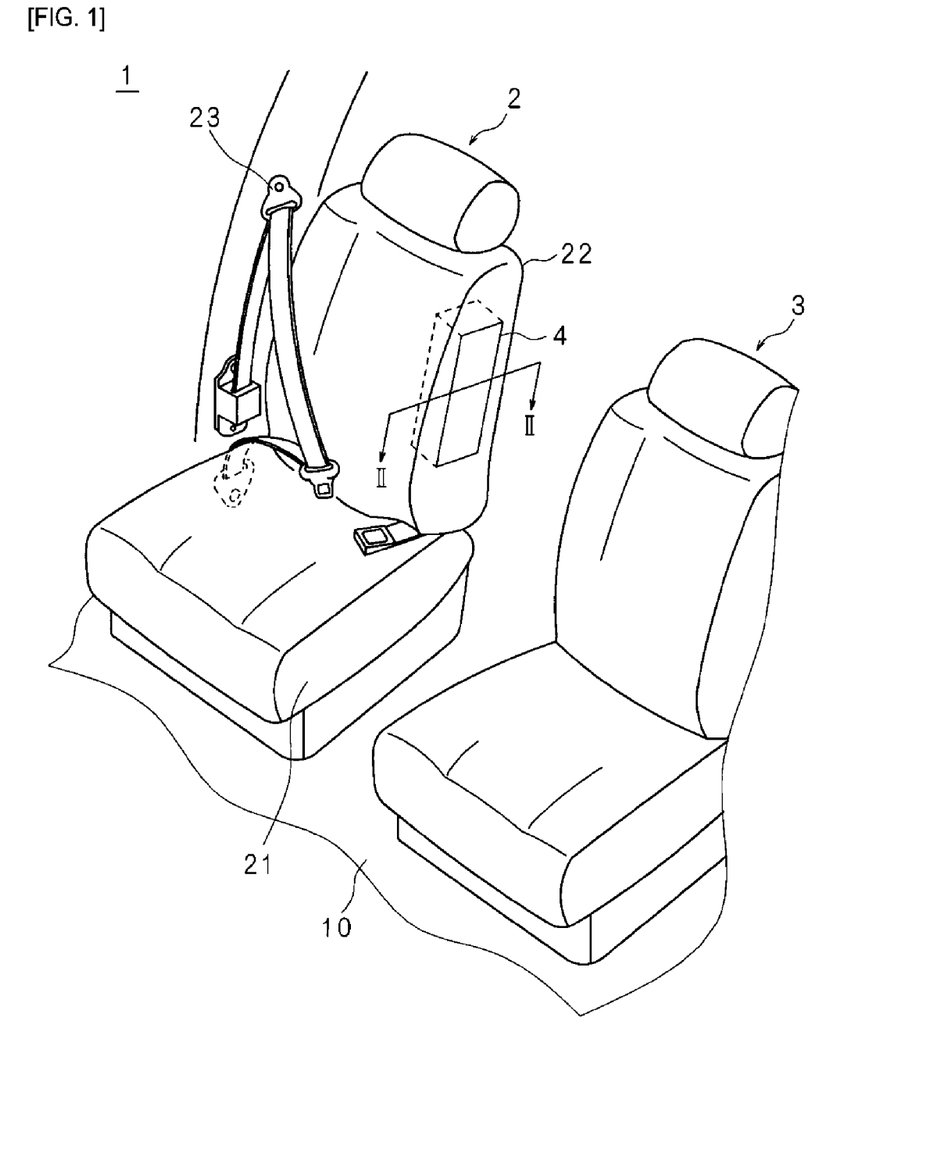
FIG. 1 is a perspective view schematically illustrating the interior of a passenger compartment in which the airbag device according to the embodiment is installed.
Figure 2:
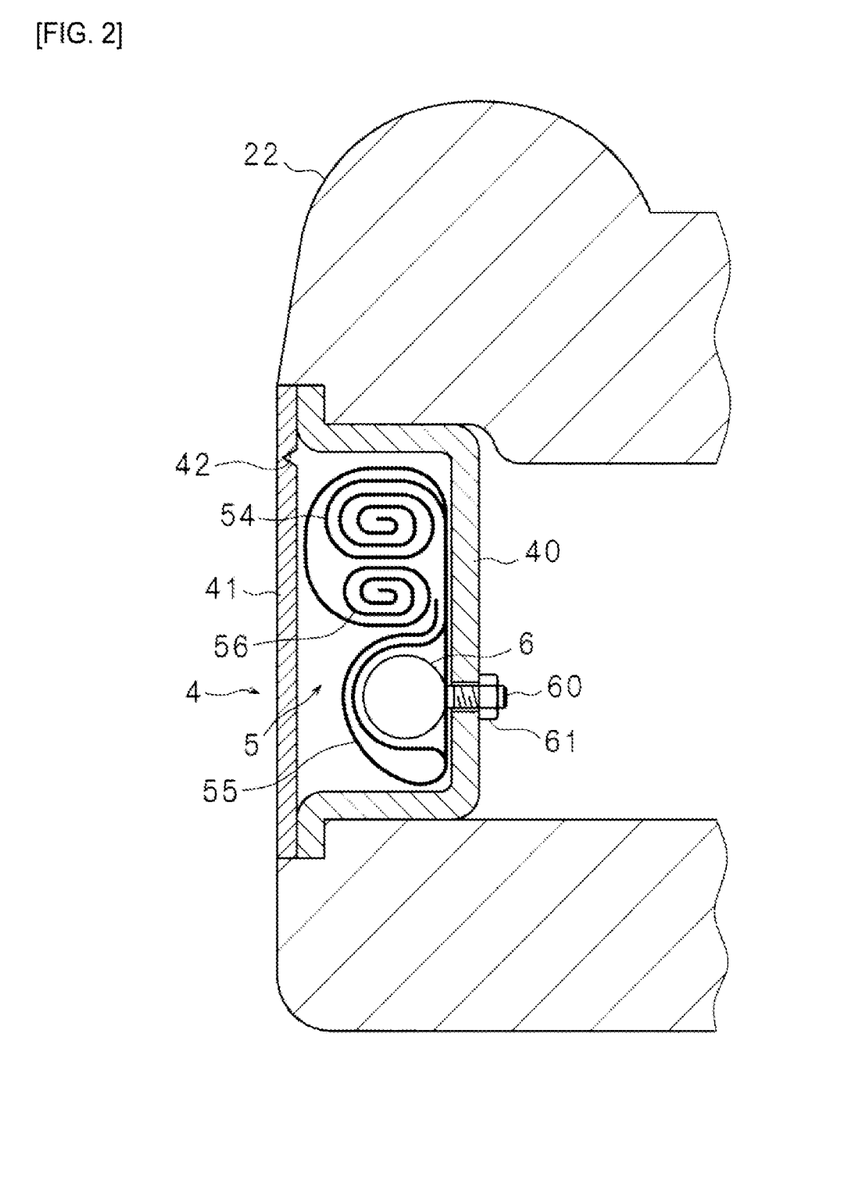
FIG. 2 is a cross-sectional view of the airbag device along line II-II in FIG. 1.

FIG. 1 is a perspective view schematically illustrating the interior of a passenger compartment in which the airbag device according to the embodiment is installed. FIG. 1 and FIG. 2 illustrate a driver seat 2 and a passenger seat 3 installed on a floor 10 of a passenger compartment 1, as well as a seatbelt 23 equipped in the driver seat 2. The driver seat 2 includes a seat portion 21 and a backrest 22 that rises upward from the rear side of the seat portion 21, and an occupant 20 (see FIG. 4) is seated on the seat part 21 with the seatbelt 23 buckled in.

The airbag device 4 according to the embodiment is incorporated into the side of the passenger seat 3 side of the backrest 22 of the driver seat 2. FIG. 2 is a cross-sectional view of the airbag device 4 along line II-II in FIG. 1. The vertical direction in this drawing corresponds to the "front-rear direction" described above.

The airbag device 4 includes an airbag cushion 5 and an inflator 6 that are stowed in the stowage part 40. The stowage part 40 is a box body provided with an outward opening on the side surface of the passenger seat 3 side (left side in FIG. 2) of the backrest 22, and is configured, for example, using a portion of the backrest 22 skeleton frame. The opening of the stowage part 40 is covered by a cover plate 41 which is flush with the side surface of the backrest 22. The cover plate 41 is a resin plate of lower strength than the stowage part 40, and a cleavage groove 42 is formed on the inner surface of the front portion (upper portion in FIG. 2) of the cover plate 41 extending in the vertical direction.

The airbag cushion 5 is, for example, a bag made of cloth reinforced by braiding high-strength fibers such as nylon fiber or the like, and is folded and stored inside the stowage part 40 according to the procedures as described below. The inflator 6 is cylindrical in shape and is mounted inside the airbag cushion 5. A stud bolt 60 protrudes radially outward from a circumferential surface of the inflator 6, and the stud bolt 60 extends outward from the airbag cushion 5. The inflator 6 is secured by tightening a nut 61 onto the stud bolt 60 passed through the bottom plate of the stowage part 40, and the airbag cushion 5 is secured by being sandwiched between the inflator 6 and the bottom plate of the stowage part 40 at the mounting point of the inflator 6.

The inflator 6 is activated in the event of an emergency such as a vehicle collision or the like and injects gas for expansion and deployment into the airbag cushion 5. The airbag cushion 5 expands explosively under the action of the injected gas of the inflator 6, ruptures the cover plate 41 at the position of the cleavage groove 42, and expands outwardly with the stowage part 40 as a support.

Figure 3:
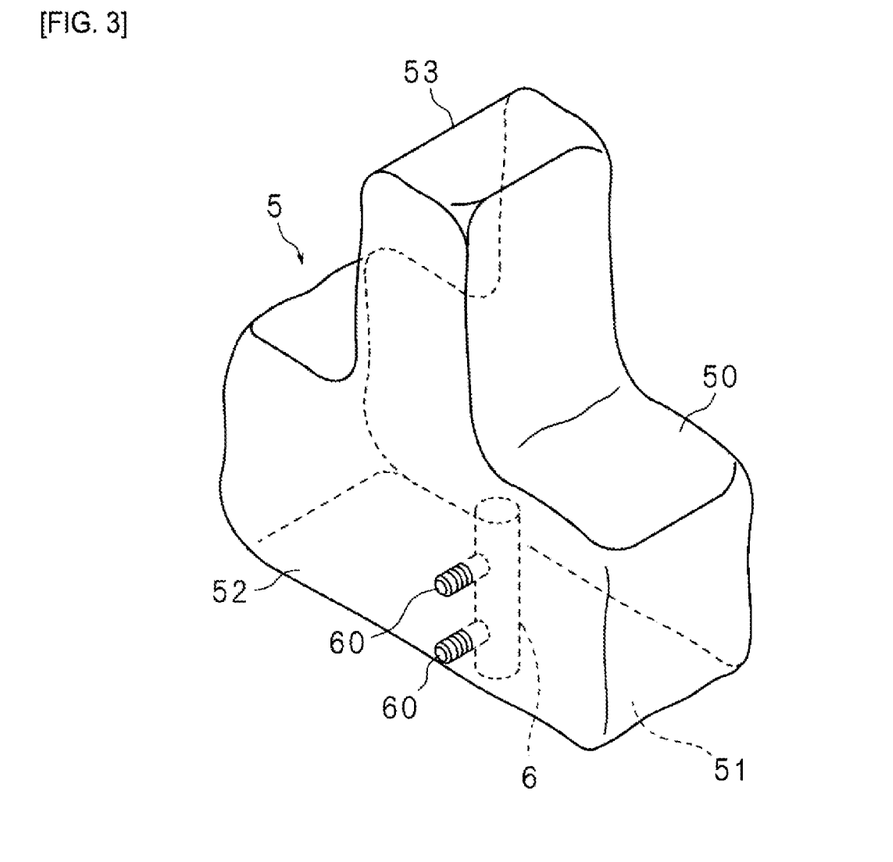
FIG. 3 is a perspective view of the airbag cushion.

FIG. 3 is a perspective view of the airbag cushion 5 illustrating the form thereof during expansion and deployment. As illustrated in this diagram, the airbag cushion 5 includes a top panel 50 and a bottom panel 51 that face each other in the vertical direction when inflated and deployed, side panels 52 that connect the peripheral edges of the top panel 50 and the bottom panel 51, and a protruding part 53 that protrudes upward from the top panel 50. The top panel 50, the bottom panel 51, and the side panels 52 are integrally joined, for example, by stitching together the respective peripheral edges, and constitute a main deployment part that expands into a rectangular parallelepiped shape in the left and right direction (the vehicle width direction) as illustrated. The protruding part 53 rises upward at the center in the length direction of the top panel 50, and deploys with an appropriate width in the left and right direction.

As illustrated by the dashed lines in the diagram, the inflator 6 is mounted on one side of the protruding part 53 along the inner surface of the side panels 52. The stud bolts 60 used for securing as described above are provided in two positions separated from each other in the vertical direction of the inflator 6, and protrude outwards from the side panels 52 from the respective positions thereof.

Figure 4:
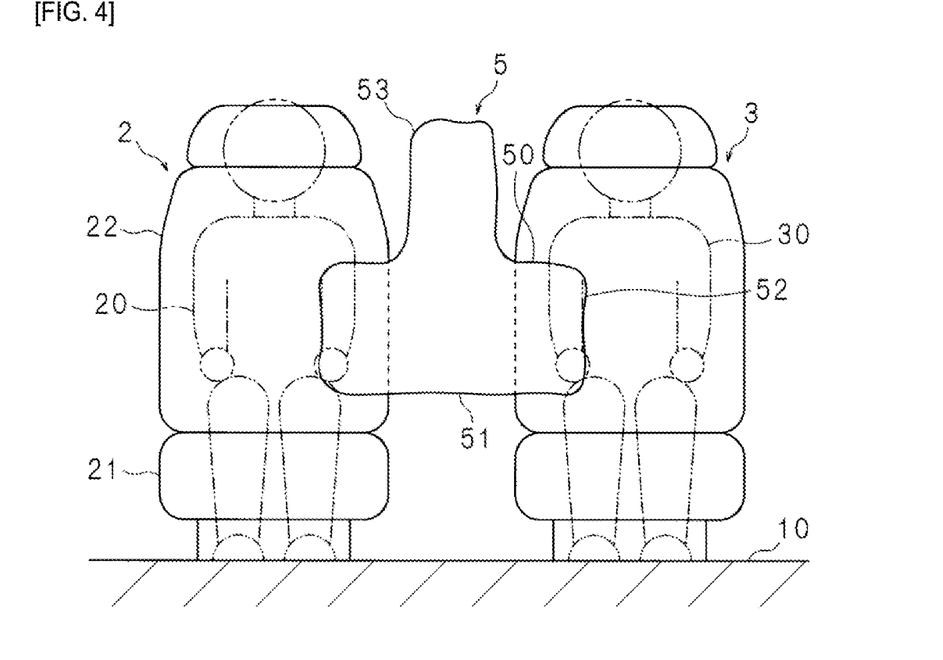
FIG. 4 is a front view illustrating the deployed state of the airbag cushion in the passenger compartment as seen from the front.

FIG. 4 is a front view illustrating the deployed state of the airbag cushion 5 in the passenger compartment 1 as seen from the front. As described above, the airbag cushion 5 is stored in the side part of the backrest 22 of the driver seat 2, and in the event of an emergency such as a vehicle collision or the like, expands under the action of the gas injected by the inflator 6 and deploys between the driver seat 2 and the passenger seat 3 which are adjacent to each other in the vehicle width direction.

The main deployment part made up of the top panel 50, the bottom panel 51, and the side panels 52 extends laterally at a height position corresponding to the waist and shoulder of the occupant 20 seated in the driver seat 2 and the occupant 30 seated in the passenger seat 3, and restrains the occupants 20 and 30 from the side on both sides reaching the front position of the driver seat 2 and the passenger seat 3. Accordingly, lateral movement of the occupants 20 and 30 during a side collision can be prevented and the occupants 20 and 30 can be effectively protected. Note that the occupants 20 and 30 in FIG. 4 are schematically illustrated by a two-dot chain line.

The protruding part 53 rises upward in the center of the main deployment part and reaches a height position corresponding to the heads of the occupant 20 seated in the driver seat 2 and the occupant 30 seated in the passenger seat 3. Therefore, even if, for example, the occupant 30 seated in the passenger seat 3 is out of position (OOP), the head of the occupant 30 that moves laterally toward the driver seat 2 can be restrained by the protruding part 53, such that an airbag device 4 can be provided that exhibits good performance in a test for evaluating the degree of protection of an occupant in a non-standard seated position, or in a so-called OOP test.

The deployment state of the airbag cushion 5 as illustrated in FIG. 4 can be achieved by setting the dimensions of each part of the airbag cushion 5 appropriately according to the positional relationship between the driver seat 2, the passenger seat 3, and the airbag device 4. However, meanwhile, the airbag cushion 5 has a shape similar to that described above, and when expanding and deploying from a folded and stored state, the plurality of portions can entangle and this can inhibit the expansion of the respective portions, resulting in the problem that the anticipated deployed shape cannot be obtained after expansion is completed.

Figure 5A:
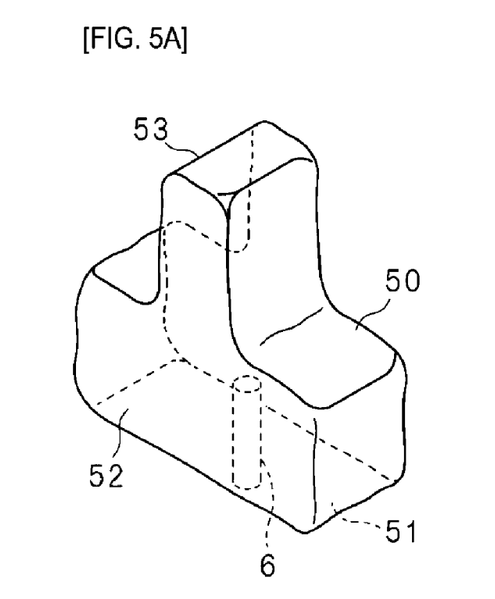
FIGS. 5A, 5B, and 5C illustrate a series of explanatory diagrams of the folding procedures of the airbag cushion.
Figure 5B:
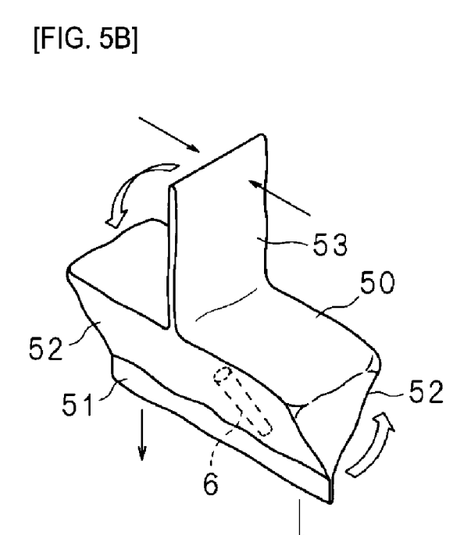
Figure 5C:
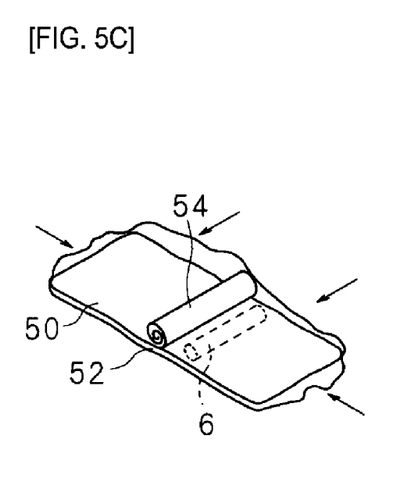
Figure 6A:
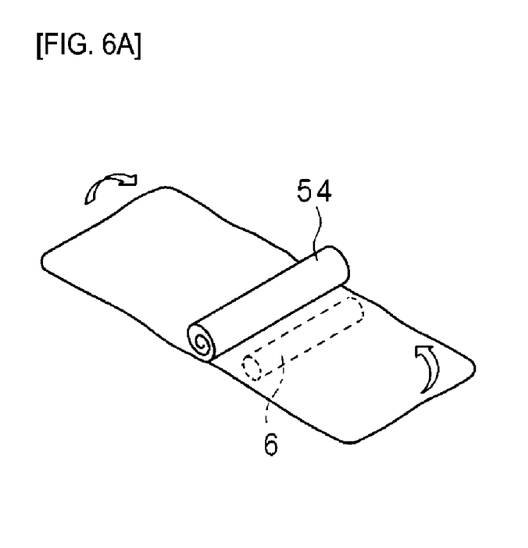
FIGS. 6A, 6B, and 6C illustrate a series of explanatory diagrams of the folding procedures of the airbag cushion.
Figure 6B:
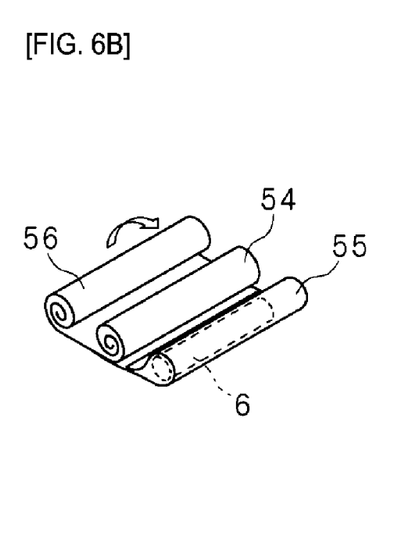
Figure 6C:
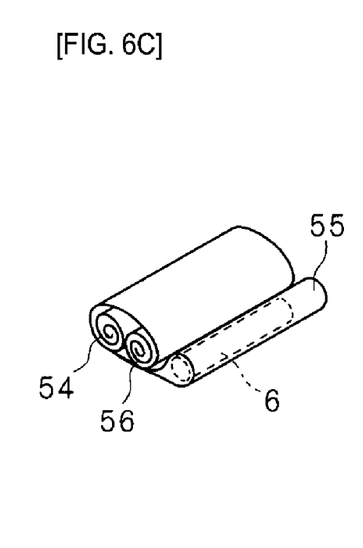

The folded configuration of the airbag cushion 5 illustrated in FIG. 2 is intended to prevent entanglement of each part during expansion and deployment, and to reliably and quickly achieve the deployed state illustrated in FIG. 4. FIG. 5 and FIG. 6 are explanatory diagrams of the folding procedures of the airbag cushion 5. The airbag cushion 5 folding procedure will be described below according to FIG. 5 and FIG. 6. Note that in this explanation, the directions of "up, down" and "left, right" are used according to the diagram.

FIG. 5A illustrates the airbag cushion 5 in a deployed state, wherein the inflator 6 is installed in a position illustrated using dashed lines in FIG. 5A. When the airbag cushion 5 is folded, the bottom panel 51 is first pulled out (pull-out step) from between the side panels 52, as indicated by the arrow in FIG. 5B, and the side panels 52 and the bottom panel 51 are connected below the top panel 50.

Next, the bottom panel 51 that was pulled out and the side panels 52 are folded into the orientation indicated by the white arrow in FIG. 5B with the long side of one side of the top panel 50 being a fold line, and as illustrated in FIG. 5C, the top panel 50 and the side panels 52 provided with the attachment part of the inflator 6 are folded so as to overlap the front and back (first step). The pulling step performed before the first step is a step that is necessary to easily and correctly achieve a desired overlap state between the top panel 50 and the side panels 52 in the first step.

Meanwhile, the protruding part 53 that protrudes from the top panel 50 is given a plate shape in which both side surfaces overlap by applying force from both left and right sides as illustrated by the arrow marks in FIG. 5B, is rolled in a roll shape from an upper end part as indicated by the white arrow in FIG. 5B, and the first roll part 54 overlapping the top panel 50 is formed, as illustrated in FIG. 5C (second step). Note that the winding direction of the first roll part 54 is not limited to the direction as illustrated, and may be the direction opposite to that of the diagram.

The order of the first step of overlaying the top panel 50 and the side panels 52 and the second step in which the protruding part 53 is rolled into a roll to form the first roll part 54 is optional, such that the second step may be performed after the first step or the first step may be performed after the second step.

In addition, based on the folding in the first step, as illustrated in FIG. 5C, the bottom panel 51 and the remaining side panel 52 overhang outward from between the top panel 50 and the side panels 52 overlapping with each other in front and in back. This overhang portion is desirably folded between the top panel 50 and the side panels 52, as indicated by the arrows in FIG. 5C. This fold-in step can be performed at an appropriate timing between the first process described above and the third process as described below.

By implementing the first step and second step including the fold-in as described above, the airbag cushion 5 is put into a form as illustrated in FIG. 6A, wherein the first roll part 54 is located in the center of the plate-like part formed by overlapping the top panel 50, bottom panel 51, and side panels 52, and the attachment part of the inflator 6 is lined up substantially parallel to one side (right side) of the first roll part 54.

Next, the right half portion including the attachment part of the inflator 6 is folded back as illustrated by the white arrow in FIG. 6A, to form a fold-back part 55 covering the attachment part of the inflator 6 from the upper side and having the end part disposed close to the right side of the first roll part 54, as illustrated in FIG. 6B (third step).

Meanwhile, the left half portion that does not include the attachment part of the inflator 6 is rolled from the end part as illustrated by the white arrow in FIG. 6A to form a second roll part 56 positioned to the left of the first roll part 54 as illustrated in FIG. 6B, and the formed portion of the second roll part 56 is folded back as illustrated by the white arrow in FIG. 6B. As such, the fold-back part covers the upper side of the first roll part 54, and the second roll part 56 is arranged in between the first roll part 54 and the fold-back part 55 as illustrated in FIG. 6C (fourth step). Note that the winding direction of the second roll part 56 is not limited to the direction as illustrated, and may be the direction opposite to that of the diagram.

In the explanation above, the fold-back part 55 in the third step is formed by folding back the right half portion that includes the attachment part of the inflator 6. However, the fold-back part 55 can be formed by folding back the first side part as described above that includes the attachment part of the inflator 6 (right side portion in the diagram) over an appropriate length, not necessarily restricted to half length. Similarly, the second roll part 56 in the fourth step can be formed by rolling the second side part (left side portion) into a roll shape over an appropriate length.

The range of the first side part and the second side part varies depending on the structure of the vehicle, the shape of the airbag cushion 5 determined by the positional relationship and the like of the seats, and the attachment position of the inflator 6 inside the airbag cushion 5. For example, if the first side part is one-fourth (or three-fourths) of the total length of the plate-like part as described above, and the second side part is the remaining three-fourths (or one-fourth), or the like, the respective side parts may deviate significantly from half of the total length.

The airbag cushion 5 is folded by the first through fourth steps described above, implemented preferably including the pull-out and fold-in steps as described above, and stowed inside the stowage part 40 as illustrated in FIG. 2. Placement of the first roll part 54, fold-back part 55, and second roll part 56 is illustrated in FIG. 2.

When the airbag cushion 5 stowed in this manner expands and deploys, the fold-back part 55 and the second roll part 56 expand to the respective sides thereof to determine the position of the top panel 50, and the first roll part 54 unfolds to extend upwardly based on the position of the top panel 50 to form the protruding part 53. Meanwhile, the bottom panel 51 is expanded so as to be separated downwardly to form the main deployment part. The deployed state as illustrated in FIG. 4 assuming the completion of expansion can be reliably achieved based on the airbag cushion 5 having the ability to expand and deploy without the main deployment part and the protruding part 53 entangling, favorably achieving protection of the occupants 20 and 30 in the event of a collision.

The embodiments presently disclosed are to be considered as examples for all points, and are not restrictive. It is intended that the scope of the present invention is not indicated by the meaning described above, but by Scope of the Patent Claims, and includes all changes in the meaning and scope equivalent to the Scope of the Patent Claims. Note that the reference numbers appended in the claims are for understanding of the claims.

EXPLANATION OF CODES

1: Passenger compartment
2: Driver seat
3: Passenger seat
4: Airbag device
5: Airbag cushion
6: Inflator
20: Occupant
30: Occupant
50: Top panel
51: Bottom panel
52: Side surface panel
53: Protruding part
54: First roll part
55: Fold-back part
56: Second roll part

The invention claimed is:

1. A method of manufacturing an airbag device by folding into a stowed state an airbag cushion that expands and deploys between adjacent seats in a passenger compartment and restrains, from the side, passengers seated in each of the seats, and includes a top panel and a bottom panel that are separated and face each other in the vertical direction during expansion and deployment, a side panel that connects the peripheral edges of the top panel and the bottom panel, a protruding part that protrudes upwards from the top panel, and an inflator that is cylindrical in shape attached along the inner surface of the side panel on one side of the protruding part, the method for folding the airbag cushion into a stowed state comprising:
a first step of folding such that the attachment part of the top panel and the inflator are front-to-back with the side panel,
a second step of rolling the protruding part starting at the end into a roll shape and forming a first roll part that overlaps the top panel,
a third step of folding back such that the first side part that includes the attachment part covers the attachment part and forms a fold-back part, with an edge thereof being placed near the edge of the first roll part, and
a fourth step of rolling the second side part that does not include the attachment part into a roll shape to form the second roll part and is arranged in between the first roll part and the fold-back part.

2. The method of manufacturing of an airbag device according to claim 1, wherein a pull-out step of pulling out the bottom panel from in between the side panels is further included before the first step.

3. The method of manufacturing of an airbag device according to claim 1, wherein a fold-in step of folding the overhanging portions of the bottom panel and the side panels resulting from the first step between the overlapping portion of the top portion and the side panels is further included between the first step and the second step or between the second step and the third step.

4. An airbag device comprising:
an airbag cushion that expands and deploys between adjacent seats in a passenger compartment and restrains from the side passengers who are respectively seated in seats, wherein
the airbag cushion includes
a top panel and a bottom panel that are separated and face each other in the vertical direction during expansion and deployment,
a side panel that connects the peripheral edges of the top panel and the bottom panel,
a protruding part that protrudes upwards from the top panel, and
an inflator that is cylindrical in shape attached along the inner surface of the side panel on one side of the protruding part, and
the airbag device is stowed by overlaying the top panel and the side panel provided with the attachment part of the inflator being front-to-back, and a first roll part which is the protruding part rolled into a roll shape, a fold-back part which is the first side part that includes the attachment part folded back in a manner covering the attachment part, and a second roll part which is the second side part rolled into a roll shape, line up above the top panel with the second roll part in the center.

* * * * *